United States Patent
Andreiadis et al.

(10) Patent No.: US 12,037,660 B2
(45) Date of Patent: Jul. 16, 2024

(54) USE OF SYNERGISTIC MIXTURE OF EXTRACTANTS FOR EXTRACTING RARE EARTH ELEMENTS FROM AN AQUEOUS MEDIUM COMPRISING PHOSPHORIC ACID

(71) Applicants: COMMISSARIAT À L'ÉNERGIE ATOMIQUE ET AUX ÉNERGIES ALTERNATIVES, Paris (FR); OCP S.A, Casablanca (MA)

(72) Inventors: Eugen Andreiadis, Avignon (FR); Marie-Thérèse Duchesne, Bollene (FR); Abla Ouaattou, Casablanca (MA); Hamid Mazouz, Casablanca (MA); Driss Dhiba, Casablanca (MA)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 606 days.

(21) Appl. No.: 17/279,411

(22) PCT Filed: Sep. 24, 2019

(86) PCT No.: PCT/FR2019/052238
§ 371 (c)(1),
(2) Date: Mar. 24, 2021

(87) PCT Pub. No.: WO2020/065201
PCT Pub. Date: Apr. 2, 2020

(65) Prior Publication Data
US 2022/0010409 A1 Jan. 13, 2022

(30) Foreign Application Priority Data
Sep. 26, 2018 (FR) ........................ 1858788

(51) Int. Cl.
*C22B 59/00* (2006.01)
*C22B 3/26* (2006.01)
(Continued)

(52) U.S. Cl.
CPC .............. *C22B 59/00* (2013.01); *C22B 3/302* (2021.05); *C22B 3/3846* (2021.05); *C22B 3/402* (2021.05)

(58) Field of Classification Search
CPC ....... C22B 59/00; C22B 3/302; C22B 3/3846; C22B 3/402; C22B 3/26; C22B 3/30; C22B 3/384; C22B 3/404; C22B 3/408
See application file for complete search history.

(56) References Cited

U.S. PATENT DOCUMENTS 4,201,747 A * 5/1980 Minagawa .............. C22B 3/408
423/21.5
10,450,629 B2 10/2019 Mary et al.
(Continued)

FOREIGN PATENT DOCUMENTS

CN 103 962 232 A * 8/2014
CN 114 703 385 A * 7/2022 ............. C22B 3/065
(Continued)

OTHER PUBLICATIONS

French Search Report for French Application No. FR1858788 dated May 10, 2019.
(Continued)

*Primary Examiner* — Daniel Berns
(74) *Attorney, Agent, or Firm* — Pearne & Gordon LLP

(57) ABSTRACT

The use of a synergistic mixture of extractants for extracting at least one rare earth element from an aqueous medium comprising phosphoric acid. The mixture comprises: —a first extractant of formula (I):
(Continued)

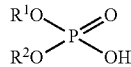

wherein $R_1$ and $R_2$, which are identical or different, represent a linear or branched, saturated or unsaturated hydrocarbon group, comprising from 6 to 12 carbon atoms, or a phenyl group optionally substituted by a linear or branched, saturated or unsaturated hydrocarbon group, comprising from 1 to 10 carbon atoms; and—a second extractant of formula (II):

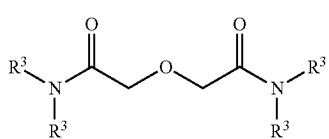

in which $R_3$ represents a linear or branched alkyl group, comprising from 6 to 12 carbon atoms.

Use of the synergistic mixture in the treatment of phosphate minerals with a view to recovering the rare earth elements contained in the minerals.

15 Claims, 4 Drawing Sheets

(51) Int. Cl.
*C22B 3/30* (2006.01)
*C22B 3/38* (2006.01)
*C22B 3/40* (2006.01)

(56) References Cited

U.S. PATENT DOCUMENTS

| | | | |
|---|---|---|---|
| 10,464,819 | B2 | 11/2019 | Miguirditchian et al. |
| 2011/0112289 | A1 | 5/2011 | Giraud et al. |
| 2013/0259776 | A1 | 10/2013 | Heres et al. |
| 2014/0356259 | A1* | 12/2014 | Lau .......... C22B 3/26 423/21.5 |
| 2019/0344198 | A1* | 11/2019 | Brigham .......... C22B 3/26 |
| 2020/0362436 | A1* | 11/2020 | Sultanov .......... C22B 3/1691 |
| 2022/0074019 | A1* | 3/2022 | Verba .......... C22B 3/165 |

FOREIGN PATENT DOCUMENTS

| | | | | |
|---|---|---|---|---|
| JP | 7 001 903 | B2 * | 1/2022 | .......... B01J 20/0203 |
| KR | 2022 0 095 738 | * | 7/2022 | .......... C22B 59/00 |
| WO | 2016046179 | A1 | 3/2016 | |
| WO | 2016177695 | A1 | 11/2016 | |

OTHER PUBLICATIONS

International Search Report for PCT/FR2019/052238 dated Jan. 27, 2020.
Written Opinion for PCT/FR2019/052238 dated Jan. 27, 2020.
Wu, Shengxi et al. "Recovery of rare earth elements from phosphate rock by hydrometallurgical process—A critical review" In: Chemical Egineering Journal, 2018, vol. 335, pp. 774-800.
Wang, Liangshi et al. "Recovery of rare earths from wet-process phosphoric acid" In: Hydrometallurgy, Feb. 1, 2010, vol. 101, No. 1-2, pp. 41-47.
Sing, Dhruva Kumar et al. "Simultaneous recovery of yttrium and uranium using D2EHPA-TBP and DNPPA-TOPO from phosphoric acid" In: Desalination and Water Treatment, 2012, vol. 38, pp. 236-244.
Nayak, P.K. et al. "Single-cycle separation of americium (III) from simulated high-level liquid waste using tetra-bis (2-ethylhexyl) diglycolamide and bis(2-ethylhexyl)phosphoric acid solution" In: Journal of Environmental Chemical Engineering, Sep. 1, 2013, vol. 1, No. 3, pp. 559-565.
Nayak, P.K. et al. "Extraction Behavior of Am(III) and Eu(III) from Nitric Acid Medium in Tetraoctyldiglycolamide-Bis (2-Ethylhexyl) Phosphoric Acid Solution" In: Separation Science and Technology, 2014, vol. 49, pp. 1186-1191.
Feng, Xie et al. "A critical review on solvent extraction of rare earths from aqueous solutions" In: Minerals Engineering, Feb. 1, 2014, pp. 10-28.
Specification and drawings for U.S. Appl. No. 16/625,557 titled "Carbamides for Separating Uranium(VI) and Plutonium(IV) Without Reducing the Plutonium(IV)" filed Dec. 20, 2019, 35 pp.

\* cited by examiner

USE OF SYNERGISTIC MIXTURE OF EXTRACTANTS FOR EXTRACTING RARE EARTH ELEMENTS FROM AN AQUEOUS MEDIUM COMPRISING PHOSPHORIC ACID

CROSS-REFERENCE TO RELATED APPLICATIONS

This is a National Stage application of PCT international application PCT/FR2019/052238, filed on Sep. 24, 2019, which claims the priority of French Patent Application No. 1858788, filed Sep. 26, 2018, both of which are incorporated herein by reference in their entirety.

TECHNICAL FIELD

The invention relates to the field of extracting and recovering rare earths.

More specifically, the invention relates to the use of a mixture of synergistic-effect extractants for extracting at least one rare earth present in an aqueous medium comprising phosphoric acid such as an aqueous solution of phosphoric acid resulting from attack on a phosphate ore by sulfuric acid.

The invention finds in particular an application in treating phosphate ores with a view to processing the rare earths present in these ores.

PRIOR ART

Rare earths (hereinafter "REs") include metals that are characterised by similar properties, namely scandium (Sc), yttrium (Y) and all the lanthanides, the latter corresponding to the 15 chemical elements listed in the Mendeleev periodic table of elements ranging from atomic number 57 for lanthanum (La) to atomic number 71 for lutecium (Lu).

In this group, there are "light" REs, i.e. with an atomic number of no more than 61 (scandium, yttrium, lanthanum, cerium, praseodymium and neodymium), and "heavy" REs, i.e. with an atomic number of at least 62 (samarium, europium, gadolinium, terbium, dysprosium, holmium, erbium, thulium and ytterbium).

The particular electron configuration of REs and in particular the unsaturated 4f electron sub-shell thereof, confers thereon unique chemical, structural and physical properties. These properties are used in industrial applications that are as varied as they are sophisticated: glass and ceramic industries, polishing, catalysis (in particular petroleum and automobile), manufacture of high-technology alloys, permanent magnets, optical devices (photographic apparatus and cameras in particular), luminophores, rechargeable batteries for electric or hybrid vehicles, alternators for wind turbines, etc.

REs consequently form part of the so-called "technological" metals, the procurement of which is strategic, but also threatened under the effect of worldwide growth and demand for these particular metals.

REs are currently produced from conventional resources such as deposits of bastnaesite hard rocks as well as alluvial deposits of monazite and xenotime. However, other non-conventional resources exist such as phosphate ores (also referred to as natural phosphates), which are exploited for manufacturing phosphoric acid and phosphate fertilisers and wherein the concentration of REs is certainly smaller but nevertheless can give rise to a profitable production of RE.

Treating phosphate ores with a view to producing phosphoric acid and phosphate fertilisers commences with an attack, or lixiviation, of these ores, previously crushed and ground, with a concentrated acid, which is typically 98% sulfuric acid, which transforms the tricalcic phosphate into phosphoric acid $H_3PO_4$ and insoluble calcium sulfate (or phosphogypsum). This attack results in aqueous solutions of phosphoric acid, with a concentration greater than 4 mol/L, which comprise variable concentrations of RE depending on the content thereof in the starting ores and according to the processing method applied to such ores.

One of the means for recovering REs from an aqueous solution of phosphoric acid resulting from the lixiviation of a phosphate ore by sulfuric acid consists in subjecting this aqueous solution, after filtration and concentration, to a liquid-liquid extraction, or solvent extraction, which consists in putting the aqueous solution in contact with an organic solution comprising one or more extractants in an organic diluent that has an affinity for the REs so as to obtain a transfer of the REs into the organic solution.

Such an extraction must be simultaneously efficient and selective vis-à-vis many other metals (hereinafter "metal impurities") that are also present in the aqueous solutions of phosphoric acid resulting from the lixiviation of the phosphate ores by sulfuric acid and in particular vis-à-vis the iron present in the form of $Fe^{3+}$ ions and the concentration of which is generally greater than 1 g/L in this type of solution.

A study of the scientific literature shows that a small number of extractants have been tested for extracting REs from a phosphoric acid medium (cf. S. Wu et al., *Chemical Engineering Journal* 2018, 335, 774-800, hereinafter reference [1]).

Two large classes of extractant have been studied, namely:

cation exchange extractants, also referred to as acid extractants, which are mainly organophosphorous compounds, such as organophosphoric acids, organo-phosphonic acids or organophosphinic acids; these are for example di-2-ethylhexylphosphoric acid (or D2EHPA or HDEHP), di(n-octylphenyl)phosphoric acid (or DOPPA), 2-ethylhexyl-2-ethylhexylphosphonic acid (or HEH[EHP] or PC88A) and bis(trimethyl-2,4,4-pentyl)phosphinic acid (sold under the reference Cyanex™ 272); and solvating extractants, also referred to as neutral extractants, such as phosphates, phosphine oxides or diglycolamides; these are for example tri-n-butyl-phosphate (or TBP), trioctylphosphine oxide (or TOPO) and N,N,N',N'-tetraoctyl-diglycolamide (or TODGA).

With regard to organophosphoric acids, it turns out that extracting REs with these acids is highly dependent on the acidity of the medium in which the REs are present. Thus D2EHPA and analogues thereof (DOPPA for example) make it possible to suitably extract heavy REs at an acidity greater than 4 mol/L of phosphoric acid but do not make it possible to extract light REs at such acidity. This is because a quantitative extraction of light REs can be obtained only at an acidity below 0.5 mol/L of phosphoric acid and therefore at least eight times lower than that which aqueous solutions of phosphoric acid resulting from the lixiviation of phosphate ores by sulfuric acid have.

Organophosphoric acids also have the drawbacks of having slow extraction kinetics and an affinity for transition metals and in particular for iron. Thus the competitive extraction of $Fe^{3+}$ ions by D2EHPA significantly reduces the extraction of REs by this extractant whereas the presence of other metallic impurities such as $Al^{3+}$, $Ca^{2+}$ or $Mg^{2+}$ appears to have low impact on this extraction (cf. L. Wang et al., *Hydrometallurgy* 2010, 101(1-2), 41-47, hereinafter reference [2]).

To overcome this poor selectivity, a first possibility would be to reduce the $Fe^{3+}$ ions into $Fe'$ ions (which are very little extracted by organophosphoric acids) by means of a reducing agent before proceeding with the extraction of the REs; nevertheless, the costs of such an operation may prove to be very high compared with the economic gain afforded by the direct selective recovery of REs. A second possibility would be adding operations aimed at removing the iron from the aqueous solutions of phosphoric acid before extracting the REs therefrom, for example by a selective precipitation of the iron followed by elimination of the precipitate by filtration, but this would lead firstly to a method that is difficult to implement and therefore of little interest industrially, and secondly to a risk of changes to the final quality of the phosphoric acid produced.

It is known that using mixtures of extractants comprising for example a cation exchanger and a solvating exchanger may in some cases make it possible to significantly improve the performance of a liquid-liquid extraction compared with what is obtained with the use of extractants alone.

However, studies show that, in the presence of a medium comprising phosphoric acid, mixtures comprising an organophosphoric acid such as D2EHPA and a solvating extractant such as TBP or a phosphine oxide (Cyanex™ 923) have an antagonistic effect on the extraction of the REs in that the extraction performance (quantified by the distribution coefficients of the REs) is inferior to what is obtained with organophosphoric acid alone (cf. the aforementioned reference [2]; D. K. Singh et al., *Desalination and Water Treatment* 2012, 38(1-3), 292-300, hereinafter reference [3]).

As for DGAs, these represent a family of extractants that was developed by a Japanese team in the context of studies on the processing of spent nuclear fuels for the purpose of coextracting the trivalent actinides and the lanthanides from a raffinate of the PUREX process but which has also been studied for recycling REs from scrap from manufacturing NdFeB permanent magnets.

Thus it was shown, in international application PCT WO 2016/046179, hereinafter reference [4], that lipophilic symmetrical DGAs with 24 carbon atoms or more, such as TODGA, make it possible to recover dysprosium, praseodymium and neodymium from an aqueous solution of nitric acid resulting from the treatment of NdFeB permanent magnets, not only quantitatively but also selectively vis-à-vis other metallic elements present in this phase, in particular vis-à-vis iron and boron.

It is indicated in reference [4] that, if the aqueous solution from which the REs are extracted is preferentially a nitric acid solution, it could also be a sulfuric or phosphoric acid solution. However, no experimental result relating to an extraction by TODGA of REs from a phosphoric acid solution—where it is known that the phosphate ions present in this type of solution are much more strongly complexing than the nitrate ions present in a nitric acid solution—is not reported in this reference.

On the other hand, it was shown in the international application PCT WO 2016/177695, hereinafter reference [5], that extracting lanthanum, neodymium, gadolinium, dysprosium and ytterbium from an aqueous solution comprising 0.5 mol/L to 5 mol/L of phosphoric acid by an organic phase comprising TODGA leads to extraction percentages that are all below 2%, and this for all the concentrations of phosphoric acid tested.

Reference [5] thus confirms that the extraction performance obtained when TODGA is used for extracting REs from an aqueous solution of nitric acid is not transposable to an extraction of REs from an aqueous solution of phosphoric acid.

Finally, although it relates to the processing of spent nuclear fuels rather than to the extraction of REs from aqueous solutions of phosphoric acid resulting from the lixiviation of phosphate ores by sulfuric acid, it is necessary to cite the work by P. K. Nayak et al. as reported firstly in *J. Environ. Chem. Eng.* 2013, 1(3), 559-565, hereinafter reference [6], and secondly in *Sep. Sci. Technol.* 2014, 49(8), 1186-1191, hereinafter reference [7].

This work shows that a mixture of extractants comprising an organophosphoric acid, in this case D2EHPA, and a lipophilic symmetrical DGA, in this case N,N,N',N'-tetra(2-ethylhexyl)diglycolamide (or TEHDGA) in n-dodecane results in a very significant extraction of the $Fe^{3+}$ ions present in an aqueous solution of nitric acid of high activity. For example, for a mixture comprising 0.25 mol/L of D2EHPA and 0.1 mol/L of TEHDGA in n-dodecane, the distribution coefficient of the iron is around 1.2 for a batch test, and more than 80% of the iron present is extracted in organic phase for mixer-settler test (cf. reference [5]).

They also show that, when the concentration of nitric acid in an aqueous solution comprising americium and europium is higher than 1 mol/L, the ability of a mixture of extractants comprising D2EHPA and TODGA to extract europium from this solution is the same as that obtained with TODGA alone (cf. reference [6]).

This work therefore makes it possible to conclude that the use of a mixture of extractants comprising an organophosphoric acid and a DGA does not have any advantage compared with the use of a DGA alone when it is a case of extracting REs from an aqueous solution of nitric acid comprising iron and/or with a nitric acid concentration greater than 1 mol/L.

Having regard to the above, there is a real need to provide an extractant or a mixture of extractants that makes it possible to extract all REs, light and heavy, from an aqueous solution of phosphoric acid having an acidity of the same type as the aqueous solutions resulting from the lixiviation of phosphate ores by sulfuric acid, and this both effectively and selectively vis-à-vis the other metals liable to be present in this solution, and in particular vis-à-vis iron.

However, in the context of their work, the inventors found that, unexpectedly, a mixture of extractants comprising an organophosphoric acid such as H2EHPA and a lipophilic symmetrical diglycolamide such as TODGA makes it possible to efficiently and selectively extract, vis-à-vis the iron, all the REs present in an aqueous solution comprising phosphoric acid, even at an acid concentration greater than 4 mol/L.

They also found that such a mixture of extractants has a synergistic effect on the extraction of REs from such an aqueous solution of phosphoric acid since:
firstly, as known from the prior art and verified by the inventors (cf. example 2 below), organophosphoric acids such as D2EHPA are unsuitable for extracting light REs from an aqueous medium comprising more than 4 mol/L of phosphoric acid, and
secondly, as known from reference [5] and corroborated by the inventors (cf. example 1 below), lipophilic symmetrical DGAs such as TODGA do not, when they are used alone, make it possible to extract rare earths from an aqueous medium comprising more than 0.5 mol/L of phosphoric acid.

The invention is based on these experimental findings.

DESCRIPTION OF THE INVENTION

The object of the invention is therefore the use of a mixture comprising:
a first extractant that is an organophosphoric acid and which complies with the following formula (I):

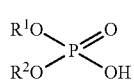

wherein $R^1$ and $R^2$, the same or different, represent a saturated or unsaturated, linear or branched hydrocarbon group, comprising from 6 to 12 carbon atoms, or a phenyl group optionally substituted by a saturated or unsaturated, linear or branched hydrocarbon group, comprising from 1 to 10 carbon atoms; and
a second extractant that is a lipophilic symmetrical DGA and which complies with the following formula (II):

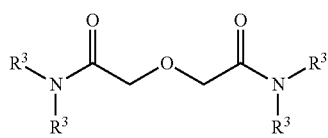

wherein $R^3$ represents a linear or branched alkyl group, comprising from 6 to 12 carbon atoms;
for extracting at least one RE from an aqueous medium comprising phosphoric acid.

In the above and hereinafter, "saturated or unsaturated, linear or branched hydrocarbon group, comprising from 6 to 12 carbon atoms" means any alkyl, alkenyl or alkynyl group, with a linear chain or with one or more branches, and comprising in total 6, 7, 8, 9, 10, 11 or 12 carbon atoms.

In a similar manner, "saturated or unsaturated, linear or branched hydrocarbon group, comprising from 1 to 10 carbon atoms" means any alkyl, alkenyl or alkynyl group, with a linear chain or with one or more branches, and comprising in total 1, 2, 3, 4, 5, 6, 7, 8, 9 or 10 carbon atoms.

Moreover, "linear or branched alkyl group comprising from 6 to 12 carbon atoms" means any alkyl group, with a linear chain or with one or more branches and comprising in total 6, 7, 8, 9, 10, 11 or 12 carbon atoms.

In the above and hereinafter, the terms "aqueous medium", "aqueous solution" and "aqueous phase" are equivalent and interchangeable just as the terms "organic solution" and "organic phase" are equivalent and interchangeable.

The expression "from . . . to . . ." is intended to mean, when it is applied to a range of concentrations, that the bounds of this range are included.

In accordance with the invention, in the above formula (I), R' and $R^2$, the same or different, preferentially represent an alkyl group, linear or branched, comprising from 6 to 12 carbon atoms, or a phenyl group substituted by a linear or branched alkyl group, comprising from 1 to 10 carbon atoms.

In addition, it is preferred that R' and $R^2$, the same or different, represent:
a linear or branched alkyl group, comprising from 8 to 10 carbon atoms such as an n-octyl, isooctyl, n-nonyl, isononyl, n-decyl, isodecyl, 2-ethylhexyl, 2-butylhexyl, 2-methylheptyl, 2-methyloctyl, 1,5-dimethylhexyl, 2,4,4-trimethylpentyl, 1,2-dimethyl-heptyl, 2,6-dimethylheptyl, 3,5,5-trimethylhexyl, 3,7-dimethyloctyl, 2,4,6-trimethylheptyl, etc., group; or
a phenyl group substituted by a linear or branched alkyl group, comprising from 6 to 10 carbon atoms such as an n-hexyl, isohexyl, n-heptyl, isoheptyl, n-octyl, isooctyl, n-nonyl, isononyl, n-decyl, isodecyl, 1-ethylpentyl, 2-ethylhexyl, 2-butylhexyl, 2-methylheptyl, 2-ethylheptyl, 2-methyloctyl, 2-methylnonyl, 1,5-dimethylhexyl, 2,4,4-trimethylpentyl, 1,2-dimethylheptyl, 2,6-dimethylheptyl, 3,5,5-trimethylhexyl, 3,7-dimethyloctyl, 2,4,6-trimethylheptyl, etc., group.

Moreover, $R^1$ and $R^2$ are preferably identical to each other.

Among the extractants of formula (I) above, particular preference is given to those wherein $R^1$ and $R^2$, identical to each other, represent a branched alkyl group, comprising from 8 to 10 carbon atoms.

Such an extractant is for example D2EHPA, which complies with the above formula (I) wherein $R^1$ and $R^2$ represent a 2-ethylhexyl group.

In accordance with the invention, in the above formula (II), $R^3$ preferably represents a linear or branched alkyl group, comprising from 8 to 10 carbon atoms, such as an n-octyl, isooctyl, n-nonyl, isononyl, n-decyl, isodecyl, 2-ethylhexyl, 2-butylhexyl, 2-methylheptyl, 2-methyloctyl, 1,5-dimethylhexyl, 2,4,4-trimethylpentyl, 1,2-dimethyl-heptyl, 2,6-dimethylheptyl, 3,5,5-trimethylhexyl, 3,7-dimethyloctyl, 2,4,6-trimethylheptyl, etc., group.

Among the extractants of formula (II) above, particular preference is given to those wherein $R^3$ represents a linear alkyl group comprising from 8 to 10 carbon atoms.

Such an extractant is for example TODGA, which complies with the above formula (II) wherein $R^3$ represents an n-octyl group.

In accordance with the invention, the mixture of extractants is preferably a mixture of D2EHPA and TODGA.

Moreover, the mixture of extractants is preferentially used in solution in an organic diluent, which may be any non-polar organic diluent the use of which has been proposed for solubilising lipophilic extractants such as a hydrocarbon or a mixture of aliphatic and/or aromatic hydrocarbons. By way of examples of such a diluent, mention can be made of n-dodecane, hydrogenated tetrapropylene (TPH), kerosene and the diluents that are sold under the references Isane™ IP-185 (Total), Isane™ IP-175 (Total), Shellsol™ D90 (Shell Chemicals) and Escaid™ 110 Fluid (Exxon Mobil), preference being given to Isane™ IP-185.

Moreover the mixture of extractants is preferably used for extracting the RE or REs from the aqueous medium wherein it (they) is (are) present by liquid-liquid extraction, in which case the use of this mixture comprises at least the aqueous medium being contacted with an organic solution that is not miscible with water, comprising the mixture of extractants in an organic diluent, and then a separation of the aqueous medium from the organic solution, whereby an organic solution comprising the RE or REs is obtained.

The organic solution, which is contacted with the aqueous medium, typically comprises from 0.2 mol/L to 2 mol/L of the first extractant and from 0.05 mol/L to 2 mol/L of the second extractant.

It goes without saying that the selection of a concentration for each of the first and second extractants in these ranges will depend on the extractants used as well as possibly the RE or REs the extraction of which it is wished to privilege.

Thus, for example, for a mixture comprising D2EHPA as the first extractant and TODGA as the second extractant, the organic solution will preferably comprise from 0.2 mol/L to 1.5 mol/L of D2EHPA and from 0.1 mol/L to 0.5 mol/L of TODGA.

In accordance with the invention, the extraction of the RE or REs from the aqueous medium by liquid-liquid extraction is preferably followed by a stripping of this RE or of these REs from the organic solution wherein it (they) was (were) extracted, in which case this stripping comprises at least a contact of the organic solution with an acid or basic aqueous solution, and then a separation of the organic solution from the aqueous solution, whereby an aqueous solution comprising the RE or REs is obtained.

The aqueous medium from which the RE or REs is (are) extracted advantageously comprises from 0.5 mol/L to 10 mol/L, preferably from 2 mol/L to 6 mol/L and even better from 4 mol/L to 5 mol/L of phosphoric acid.

Such an aqueous medium may in particular be an aqueous solution of phosphoric acid resulting from the lixiviation of a phosphate ore by sulfuric acid.

Such an aqueous solution may contain REs at a total concentration ranging from 30 mg/L to 1200 mg/L, more precisely from 100 mg/L to 1000 mg/L, as well as a certain number of metallic impurities including iron but also magnesium, aluminium, calcium, zinc, chromium, vanadium, etc.

Whatever the case, the RE or the REs is (are) preferably selected from yttrium, lanthanum, neodymium, dysprosium, ytterbium and mixtures thereof.

Other features and advantages of the invention will emerge from the following additional description which refers to the accompanying figures.

It goes without saying that this additional description is given only by way of illustration of the object of the invention and must in no case be interpreted as a limitation to this object.

BRIEF DESCRIPTION OF THE FIGURES

FIG. 1A shows the change in the distribution coefficients of the REs and of iron, denoted $D_M$ and set out on a logarithmic scale, as a function of the molar concentration of TODGA, denoted [TODGA], in the organic phases, while FIG. 1B shows the change in the separation factors between the REs and the iron, denoted $FS_{TR/Fe}$ and also set out on a logarithmic scale, as a function of the concentration of TODGA; by way of comparison, the $D_M$ and $FS_{TR/Fe}$ values obtained under the same operating conditions with an organic phase comprising only D2EHPA as extractant are also indicated in these figures.

FIG. 4A shows the change in the distribution coefficients of the REs and of iron, denoted $D_M$ and set out on a logarithmic scale, as a function of the molar concentration of D2EHPA, denoted [D2EHPA], in the organic phases, while FIG. 4B shows the separation factors between the RE and the iron, denoted $FS_{TR/Fe}$, obtained with an organic phase comprising 1 mol/L of D2EHPA.

In FIGS. 3 and 4B, the error bars correspond to a relative uncertainty of 10% that encompasses the various analytical and experimental uncertainties.

DETAILED DESCRIPTION OF PARTICULAR EMBODIMENTS

Figure 1A:
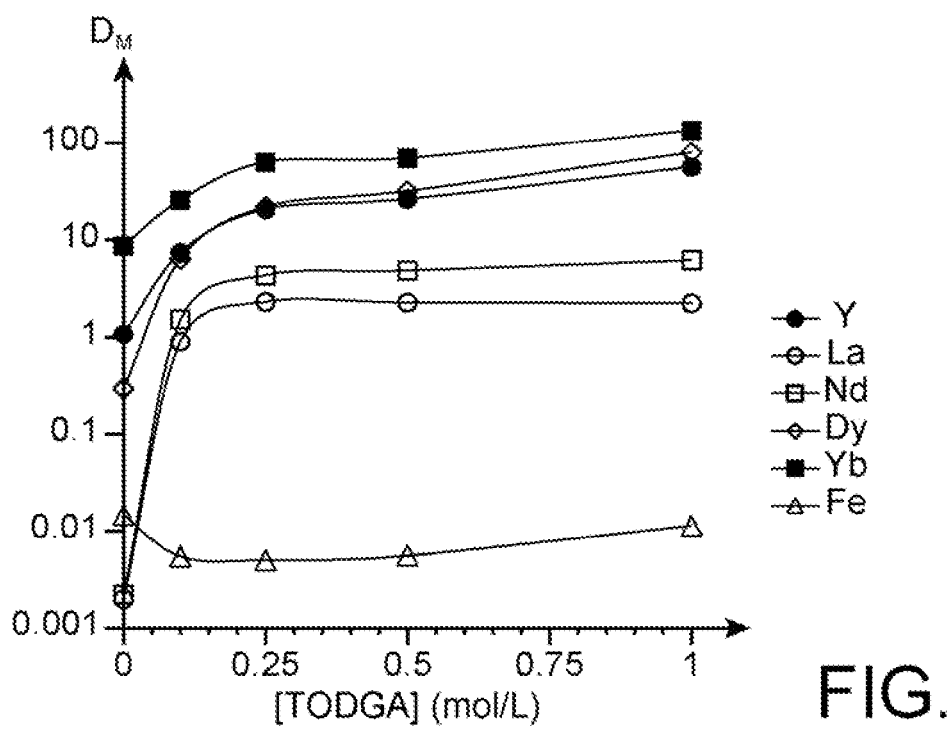
FIGS. 1A and 1B illustrate the results of extraction tests that were performed on aqueous phases of phosphoric acid comprising five REs—namely yttrium, lanthanum, neodymium, dysprosium and ytterbium—as well as iron, using organic phases comprising 0.5 mol/L of D2EHPA and a variable molar concentration of TODGA.

The extraction tests that are reported in the following examples were all performed using, as aqueous phases, aliquots of a synthetic aqueous solution, representative of aqueous solutions of phosphoric acid actually obtained during the production of $H_3PO_4$ by lixiviation of natural phosphates with $H_2SO_4$.

This synthetic aqueous solution comprises, apart from phosphoric acid, three light REs, namely yttrium, lanthanum and neodymium, two heavy REs, namely dysprosium and ytterbium, and a major and detrimental impurity, namely iron. It was prepared by dissolving oxides of the corresponding metals at the +3 oxidation state in a solution of concentrated $H_3PO_4$ and then adjusting the concentration of $H_3PO_4$ of this solution to 4.6 mol/L.

Its composition by mass of metallic elements is presented in table I below.

TABLE I

| Elements | Y | La | Nd | Dy | Yb | Fe |
|---|---|---|---|---|---|---|
| [C] in mg/L | 216 | 195 | 173 | 204 | 267 | 1525 |

The organic phases were prepared using Isane™ IP185 as organic diluent and prebalanced by contact with an aqueous solution comprising 4.6 mol/L of $H_3PO_4$.

Moreover, the extraction and stripping tests that are reported in the following examples were all performed in microtubes with volumes of less than 1.5 mL, at a temperature of 45° C., using a ratio by volume between the organic phases and the aqueous phases (O/A) equal to 1 and subjecting these phases to a single contact of 20 minutes, under stirring by means of a Vibrax™ stirrer. After centrifugation, the organic and aqueous phases were separated by settling.

The distribution coefficients, the separation factors and the stripping yields were determined in accordance with the conventions of the field of liquid-liquid extractions, namely that:

the distribution coefficient of a metallic element M, denoted $D_M$, between two phases, respectively organic and aqueous, is equal to:

$$D_M = \frac{[M]_{org,f}}{[M]_{aq,f}} = \frac{[M]_{aq,i} - [M]_{aq,f}}{[M]_{aq,f}}$$

with:

$[M]_{org,f}$=concentration of M in the organic phase after extraction (or stripping), $[M]_{aq,f}$=concentration of M in the aqueous phase after extraction (or stripping), and $[M]_{aq,i}$=concentration of M in the aqueous phase before extraction (or stripping);

the separation factor between two metallic elements M1 and M2, denoted $FS_{M1/M2}$, is equal to:

$$FS_{M1/M2} = \frac{D_{M1}}{D_{M2}}$$

with:

$D_{M1}$=distribution coefficient of the metallic element M1, and $D_{M2}$=distribution coefficient of the metallic element M2;

the stripping yield of a metallic element M, denoted $R_M$, of an organic phase is equal to:

$$R_M = \frac{[M]_{aq,f}}{[M]_{org,i}} \times 100$$

with:

$[M]_{aq,f}$=concentration of M in the aqueous phase after stripping, and $[M]_{org,i}$=concentration of M in the organic phase before stripping.

The multi-element analyses of the aqueous or organic phases comprising the REs (initial synthetic solution, aqueous and organic phases after extraction, aqueous phases after stripping, etc.) were performed by atomic emission spectrometry the source of which is an argon plasma generated by inductive coupling, after dilution to bring the metallic elements to measurable concentrations.

Example 1: Extraction of the REs by Mixtures of Extractants D2EHPA/TODGA in Accordance with the Invention 1.1—Extraction Tests

*First Series of Tests:

Extraction tests were performed using, as organic phases, solutions comprising 0.5 mol/L of D2EHPA and of TODGA at a concentration of 0.1 mol/L, 0.25 mol/L, 0.5 mol/L or 1 mol/L and, by way of comparison, a solution comprising 0.5 mol/L of D2EHPA but free from TODGA.

FIG. 1A illustrates the change in the distribution coefficients of the REs and of iron, $D_M$, obtained at the end of these tests as a function of the concentration of TODGA in the organic phases.

As shown in this figure, adding TODGA to D2EHPA results in a high increase in the distribution coefficients of the REs and therefore in their extraction of an aqueous phase of phosphoric acid.

The D2EHPA/TODGA mixtures have a particularly high affinity for dysprosium, ytterbium and yttrium.

The affinity thereof is substantially lower for lanthanum and neodymium but remains nevertheless high ($D_{La}^{max}$=2.3) if it is compared with that which D2EHPA alone has ($D_{La}$<0.01).

Moreover, adding TODGA to D2EHPA results in a drop in the distribution coefficient of iron by a factor of 3 compared with that obtained with D2EHPA alone. This distribution coefficient is very small ($D_{Fe}$=0.005) for concentrations of TODGA ranging up to 0.25 mol/L, which clearly shows the excellent selectivity for REs towards iron that the D2EHPA/TODGA mixtures have.

Figure 1B:
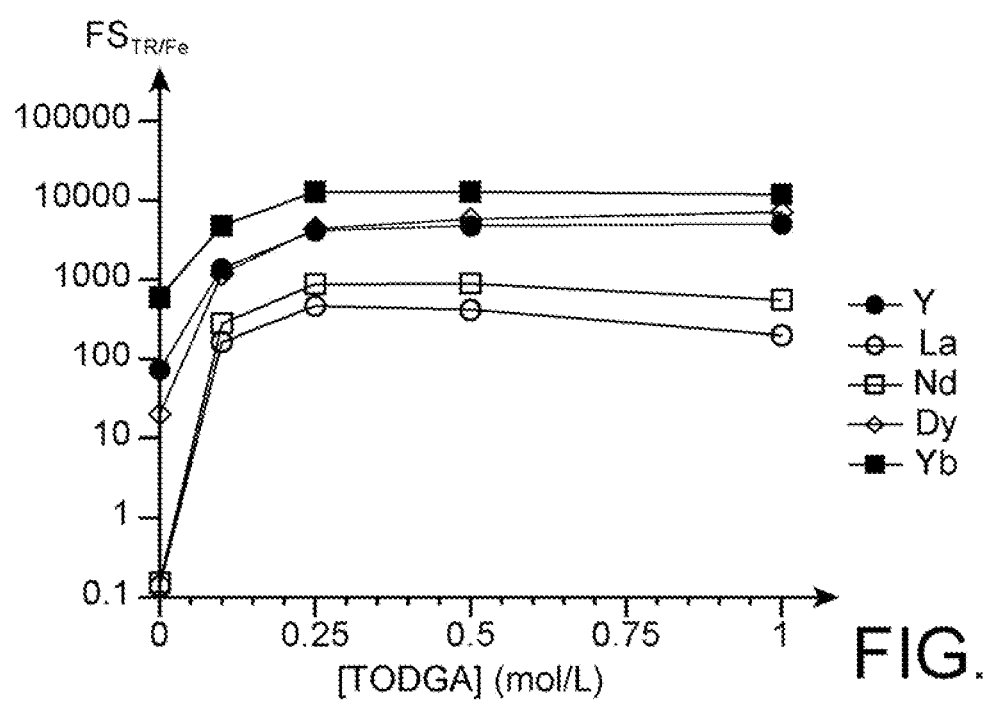

The change in the separation factors between the REs and iron, $FS_{TR/Fe}$, as a function of the concentration of TODGA in the organic phases is illustrated in FIG. 1B.

This figure shows that the maximum values of $FS_{TR/Fe}$ are very significant for heavy REs such as ytterbium ($FS_{Yb/Fe}$>12,500) and remain very satisfactory for light REs such as lanthanum ($FS_{La/Fe}$=460).

By way of comparison, the best separation factor between RE and iron that is obtained for D2EHPA alone, at a concentration of 0.5 mol/L in organic phase, is the separation factor between ytterbium and iron, which is at a minimum 20 times less ($FS_{Yb/Fe}$≈600) than that obtained with D2EHPA/TODGA mixtures.

*Second Series of Tests:

Tests were performed using, as organic phases, solutions comprising 0.5 mol/L of TODGA and D2EHPA at a concentration of 0.1 mol/L, 0.5 mol/L, 1 mol/L or 2 mol/L.

Figure 2:
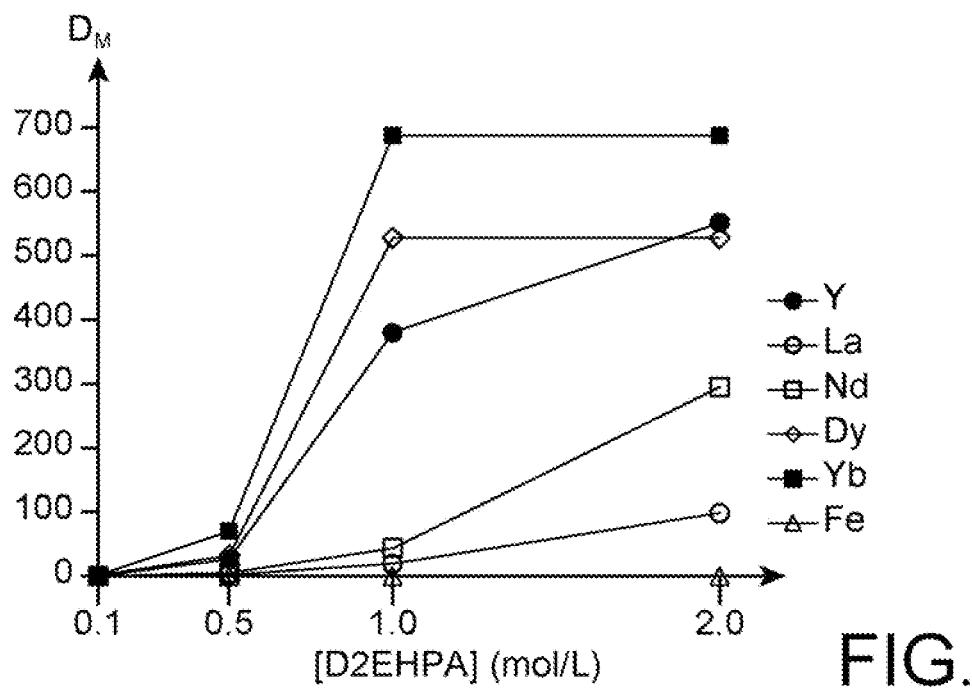
FIG. 2 illustrates the results of extraction tests that were performed on aqueous phases of phosphoric acid comprising the aforementioned five REs and iron, using organic phases comprising a variable molar concentration of D2EHPA and 0.5 mol/L of TODGA; more specifically, this figure shows the change in the distribution coefficients of the REs and of iron, denoted $D_M$ and set out on an arithmetic scale, as a function of the molar concentration of D2EHPA, denoted [D2EHPA], in the organic phases.

FIG. 2 illustrates the change in the distribution coefficients of the REs and iron, $D_M$, obtained at the end of these tests as a function of the concentration of D2EHPA in the organic phases.

As shown in this figure, adding D2EHPA to TODGA results in a high increase in the distribution coefficients of the REs and therefore in the extraction thereof in an aqueous phase of phosphoric acid.

A concentration of D2EHPA greater than 0.1 mol/L in the mixture is necessary for obtaining good extraction performance for all the REs. By way of example, the distribution coefficient of lanthanum is very small when the concentration of D2EHPA in the mixture is 0.1 mol/L ($D_{La}$=0.06) but increases very significantly when the concentration of D2EHPA in the mixture is 0.5 mol/L ($D_{La}$=2.2). By way of comparison, the affinity for lanthanum of D2EHPA alone at a concentration of 0.5 mol/L is very small ($D_{La}$=0.01).

These results corroborate those of reference [5], namely that TODGA alone does not make it possible to extract REs from an aqueous phase of phosphoric acid.

On the other hand, they show that using a concentration of D2EHPA at least equal to that of TODGA and preferably twice as great as that of TODGA makes it possible to obtain a good extraction of all the REs.

1.2—Stripping Tests

Stripping tests were performed using:
as organic phases: aliquots of the organic phase resulting from the extraction test that was performed at point 1.1 above with a mixture comprising 0.5 mol/L of D2EHPA and 0.25 mol/L of TODGA; and as aqueous phases: aqueous solutions comprising:
either 0.5 mol/L, 1 mol/L or 6 mol/L of $H_2SO_4$,
or 1 mol/L of $H_2SO_4$ and 0.125 mol/L of $Na_2SO_4$,
or 5 mol/L or 10 mol/L of $H_3PO_4$.

Figure 3:
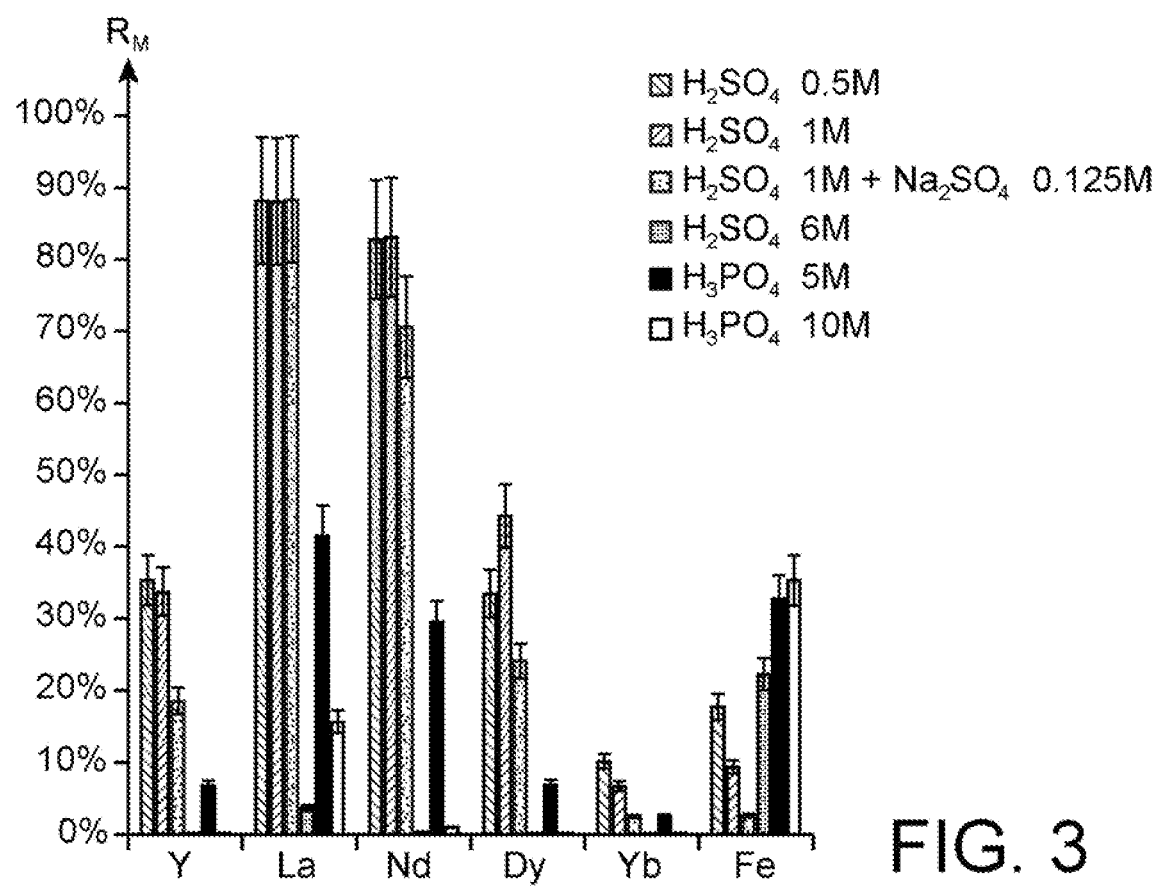
FIG. 3 illustrates the stripping yields, denoted $R_M$ and expressed as %, as obtained during stripping tests that were performed on an organic phase comprising the aforementioned five REs, iron, 0.5 mol/L of D2EHPA and 0.25 mol/L of TODGA, using various acidic aqueous phases.

FIG. 3 illustrates the stripping yields, $R_M$, obtained at the end of these tests.

As shown by this figure, aqueous solutions of highly concentrated $H_3PO_4$ (5 mol/L or 10 mol/L) make it possible also to strip lanthanum and neodymium as well as iron but do not make it possible to strip yttrium, dysprosium and ytterbium, which remain in organic phase.

Aqueous solutions of dilute $H_2SO_4$ (0.5 mol/L and 1 mol/L) make it possible to strip almost quantitatively lanthanum and neodymium, partially yttrium, dysprosium and ytterbium. A 1 mol/L solution of $H_2SO_4$ allows better stripping selectivity of the REs towards iron than a 0.5 mol/L solution of $H_2SO_4$. Adding $Na_2SO_4$ to the extent of 0.125 mol/L further improves this selectivity but to the detriment of a drop in the stripping yields of yttrium, neodymium and dysprosium.

FIG. 3 also shows that iron is partially but selectively stripped by an aqueous solution comprising 6 mol/L of H2SO4.

It is therefore possible to envisage the implementation of a scheme in which the organic phase resulting from the extraction of REs would be subjected to a step of washing by an aqueous solution comprising for example 6 mol/L of $H_2SO_4$ in order to selectively eliminate the iron present in this organic phase, before being subjected to a step of stripping of the REs, for example by means of a solution of dilute $H_2SO_4$, optionally with $Na_2SO_4$ added.

The results obtained with the aqueous solution comprising both sulfuric acid and sodium sulfate would also make it possible to envisage a scheme wherein the REs present in aqueous solution after stripping would be recovered by precipitation, for example in the form of double sulfates of RE and sodium, carbonates, oxalates, etc., this type of precipitation being known in the literature.

Example 2: Extraction of REs by D2EHPA Alone (Comparative Example)

By way of comparison, extraction tests were performed using, as organic phases, solutions comprising 0.1 mol/L, 0.5 mol/L, 1 mol/L, 1.5 mol/L or 2 mol/L of D2EHPA.

Figure 4A:
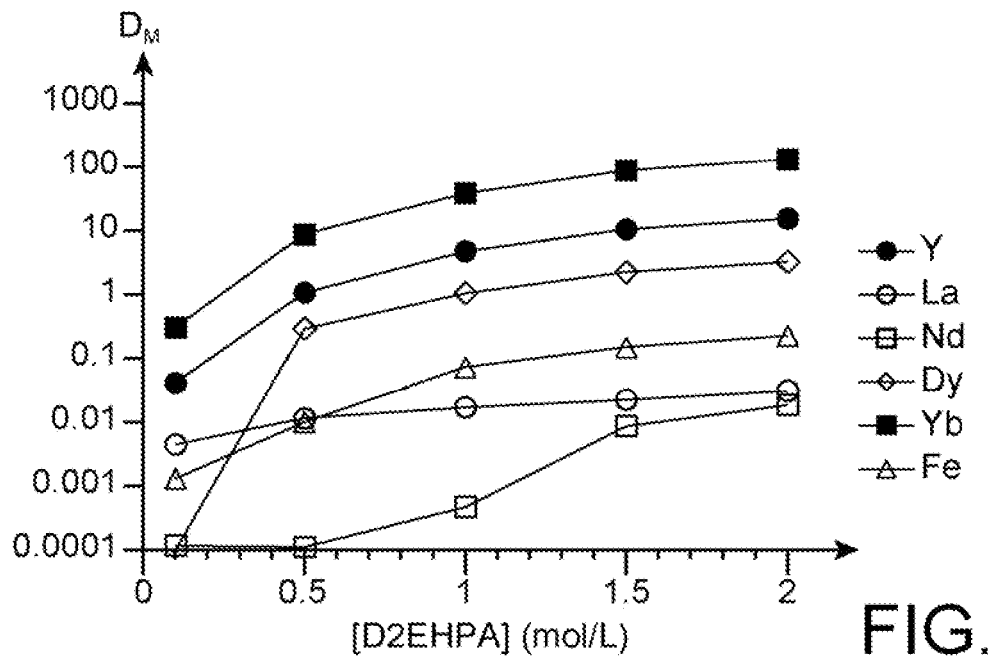
FIGS. 4A and 4B illustrate, by way of comparison, the results of extraction tests that were performed on aqueous phases of phosphoric acid comprising the aforementioned five REs and iron, using organic phases comprising only D2EHPA as extractant, at variable molar concentrations.

FIG. 4A illustrates the change in the distribution coefficients of the REs and of iron, $D_M$, obtained at the end of these tests as a function of the concentration of D2EHPA in the organic phases.

This figure shows clearly that the extraction of the REs by D2EHPA decreases with the increase in the ionic radius of the REs. Thus D2EHPA has good affinity for the REs with a small ionic radius such as yttrium, dysprosium and ytterbium but makes it impossible or almost impossible to extract REs with a higher ionic radius such as lanthanum and neodymium ($D_M$<0.1 whatever the concentration of D2EHPA in organic phase).

Figure 4B:
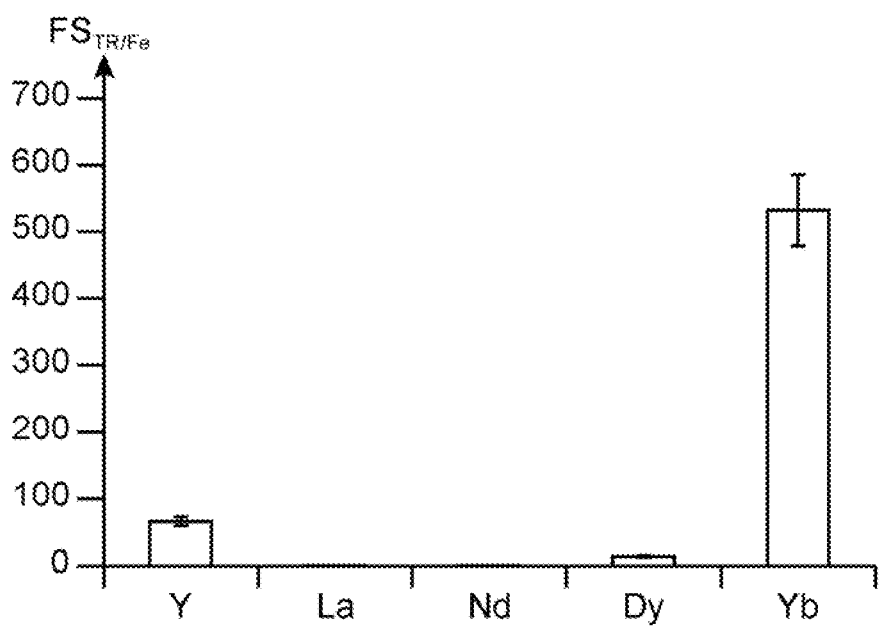

Moreover, the separation factors between the REs and iron, $FS_{TR/Fe}$, obtained with a concentration of D2EHPA of 1 mol/L in organic phase are set out in FIG. 4B. These separation factors are satisfactory for ytterbium ($FS_{Yb/Fe}$=500). On the other hand, they are not at all satisfactory for the other REs.

It should be noted that no significant variation in these separation factors is observed as a function of the concentration of D2EHPA in organic phase.

Example 3: Extraction of the REs by D2EHPA/TBP and D2EHPA/TOPO Mixtures

Comparative Example

Since TODGA is a solvating extractant, extraction tests were performed in order to check whether mixtures comprising D2EHPA and a solvating extractant other than TODGA would be liable to have the same synergic effect as that observed when D2EHPA is used in a mixture with TODGA.

These extraction tests were performed using, as organic phases, solutions comprising 0.5 mol/L of D2EHPA and:
either tri-n-butyl phosphate (or TBP) at a concentration of 0.1 mol/L, 0.25 mol/L or 0.5 mol/L;
or trioctylphosphine oxide (or TOPO) at a concentration of 0.1 mol/L, 0.25 mol/L or 0.5 mol/L.

Figure 5:
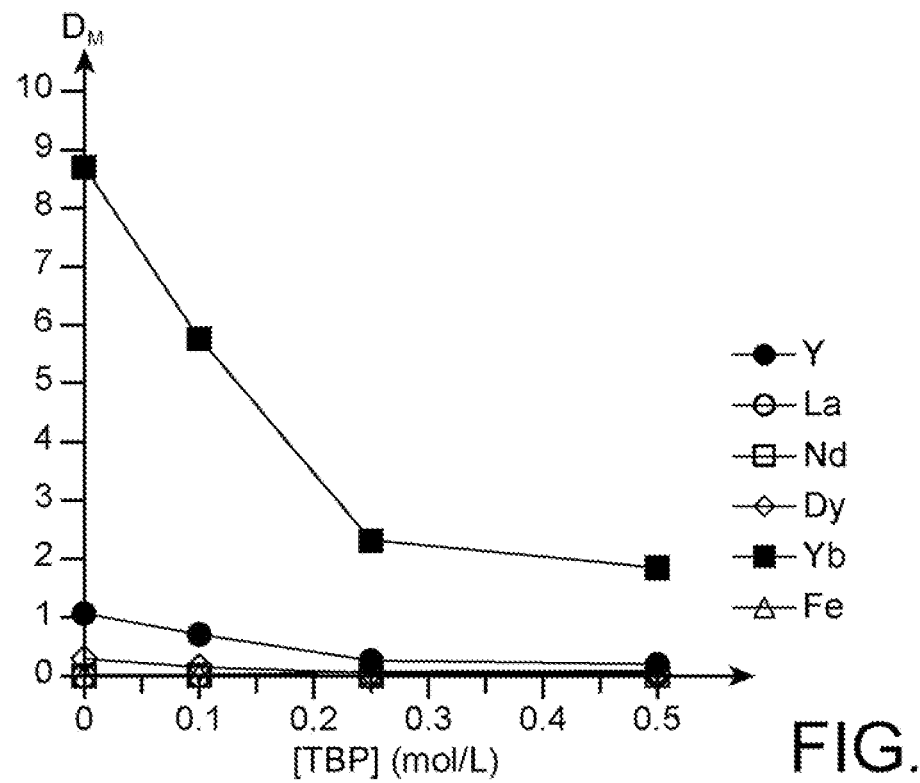
FIG. 5 illustrates, by way of comparison, the results of extraction tests that were performed on aqueous phases of phosphoric acid comprising the aforementioned five REs and iron, using organic phases comprising 0.5 mol/L of D2EHPA and a variable molar concentration of TBP; more specifically, this figure shows the change in the distribution coefficients of the REs and of iron, denoted $D_M$ and set out on an arithmetic scale as a function of the molar concentration of TBP, denoted [TBP], in the organic phases; the $D_M$ values obtained under the same operating conditions with an organic phase comprising only D2EHPA as extractant are also indicated in this figure.
Figure 6:
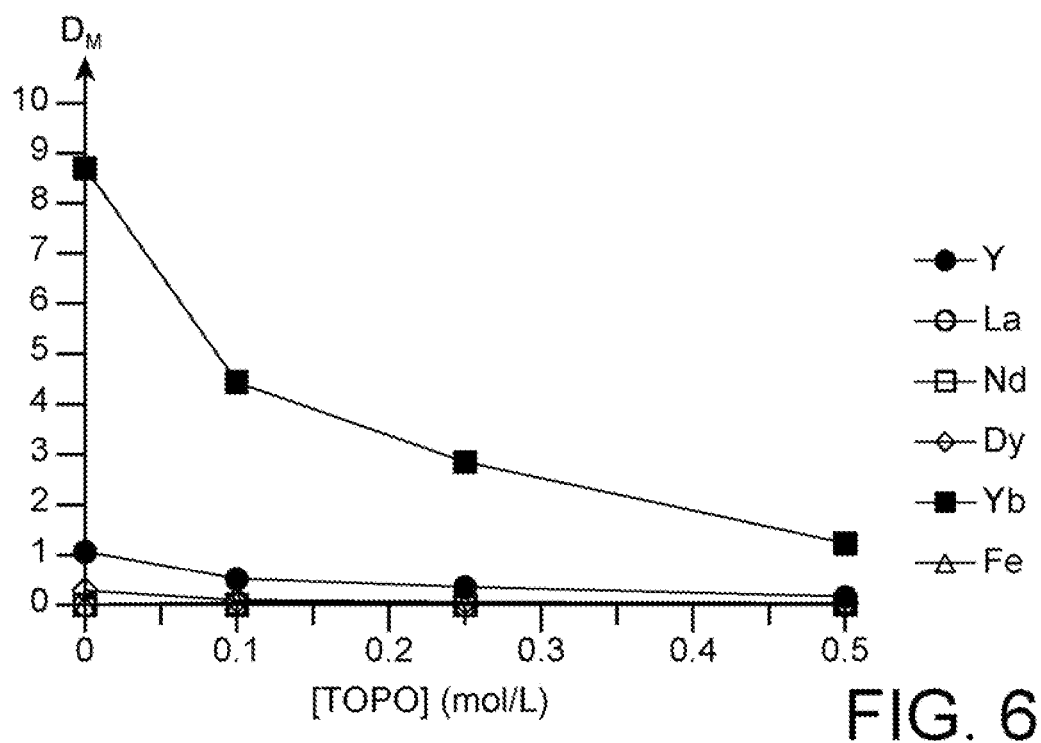
FIG. 6 illustrates, by way of comparison, the results of extraction tests that were performed on aqueous phases of phosphoric acid comprising the aforementioned five REs and iron, using organic phases comprising 0.5 mol/L of D2EHPA and a variable molar concentration of TOPO; more specifically, this figure shows the change in the distribution coefficients of the REs and of iron, denoted $D_M$ and set out on an arithmetic scale as a function of the molar concentration of TOPO, denoted [TOPO], in the organic phases; the $D_M$s obtained under the same operating conditions with an organic phase comprising only D2EHPA as extractant are also indicated in this figure.

The results obtained at the end of these tests are illustrated in terms of distribution coefficients, $D_M$, in FIG. 5 for the D2EHPA/TBP mixtures and in FIG. 6 for the D2EHPA/TOPO mixtures.

As shown in FIG. 5, adding TBP to D2EHPA results in an appreciable reduction in the distribution coefficients of the REs and therefore in their extraction of an aqueous phase of phosphoric acid, except in the case of lanthanum and neodymium since these are not already extracted by D2EHPA alone.

This reduction in $D_M$, which is all the greater as the concentration of TBP in organic phase increases, thus shows the existence of an antagonistic effect of D2EHPA/TBP mixtures on the extraction of REs from an aqueous solution of phosphoric acid.

In a similar manner, FIG. 6 shows a constant reduction in the distribution coefficients of the REs as a function of the concentration of TOPO in organic phase, there also showing the existence of an antagonistic effect of D2EHPA/TOPO mixtures on the extraction of REs from an aqueous solution of phosphoric acid.

These results corroborate those given in the aforementioned references [2] and [3] for D2EHPA/TBP and D2EHPA/TOPO mixtures, and confirm that the use of a mixture comprising an organophosphoric acid such as D2EHPA and a solvating extractant in principle has no interest if it is wished to extract REs from an aqueous solution comprising phosphoric acid.

REFERENCES CITED

[1] S. Wu et al., *Chemical Engineering Journal* 2018, 335, 774-800
[2] L. Wang et al., *Hydrometallurgy* 2010, 101(1-2), 41-47
[3] D. K. Singh et al., *Desalination and Water Treatment* 2012, 38(1-3), 292-300
[4] International application PCT WO 2016/046179
[5] International application PCT WO 2016/177695
[6] P. K. Nayak et al., *J. Environ. Chem. Eng.* 2013, 1(3), 559-565
[7] P. K. Nayak et al., *Sep. Sci. Technol.* 2014, 49(8), 1186-1191

What is claimed is:

1. A method for extracting at least one rare earth E1 selected from lanthanum, cerium, praseodymium and neodymium together with at least one rare earth E2 selected from samarium, europium, gadolinium, terbium, dysprosium, holmium, erbium, thulium, ytterbium, lutetium, scandium and yttrium, from an aqueous medium comprising phosphoric acid, the aqueous medium resulting from the lixiviation of a phosphate ore by sulfuric acid and comprising, further to the rare earths E1 and E2, metallic impurities including iron, the method comprising:
contacting the aqueous medium with an organic solution which is not miscible with water and which comprises a mixture of extractants comprising:
a first extractant of formula (I):

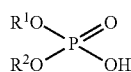

wherein $R^1$ and $R^2$, the same or different, represent a saturated or unsaturated, linear or branched hydrocarbon group comprising from 6 to 12 carbon atoms, or a phenyl group, optionally substituted by a saturated or unsaturated, linear or branched hydrocarbon group comprising from 1 to 10 carbon atoms; and
a second extractant or formula (II):

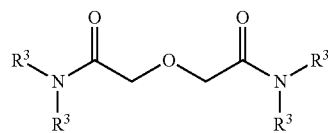

wherein $R^3$ represents a linear or branched alkyl group, comprising from 6 to 12 carbon atoms; and then:
separating the aqueous medium from the organic solution comprising the mixture of extractants, whereby the at least one rare earth E1 and the at least one rare earth E2 are present in the organic solution.

2. The method of claim 1, wherein the aqueous medium comprises rare earths E1 and E2 at a total concentration from 30 mg/L to 1200 mg/L prior to contacting with the organic solution.

3. The method of claim 1, wherein the aqueous medium comprises from 2 mol/L to 6 mol/L of phosphoric acid prior to contacting with the organic solution.

4. The method of claim 3, wherein the aqueous medium comprises from 4 mol/L to 5 mol/L of phosphoric acid.

5. The method of claim 1, wherein the at least one rare earth E1 is lanthanum or neodymium, and the at least one rare earth E2 is yttrium, dysprosium or ytterbium.

6. The method of claim 1, wherein $R^1$ and $R^2$ are identical to each other.

7. The method of claim 1, wherein the first extractant is di(2-ethylhexyl)phosphoric acid.

8. The method of claim 1, wherein the mixture of extractants comprises di(2-ethylhexyl)phosphoric acid and N,N,N',N'-tetraoctyldiglycolamide.

9. The method of claim 1, wherein the organic solution comprises the mixture of extractants in an organic diluent.

10. The method of claim 1, wherein the organic solution comprises from 0.2 mol/L to 2 mol/L of the first extractant and from 0.05 mol/L to 2 mol/L of the second extractant.

11. The method of claim 1, which further comprises contacting the organic solution with an acid or basic aqueous solution, and then separating the organic solution from the aqueous solution, whereby an aqueous solution comprising the at least one rare earth E1 and the at least one rare earth E2 is obtained.

12. The method of claim 1, wherein $R^1$ and $R^2$ represent a linear or branched alkyl group comprising from 6 to 12 carbon atoms, or a phenyl group substituted by a linear or branched alkyl group comprising from 1 to 10 carbon atoms.

13. The method of claim 12, wherein $R^1$ and $R^2$ represent a linear or branched alkyl group comprising from 8 to 10 carbon atoms, or a phenyl group substituted by a linear or branched alkyl group comprising from 6 to 10 carbon atoms.

14. The method of claim 1, wherein $R^3$ represents a linear or branched alkyl group comprising from 8 to 10 carbon atoms.

15. The method of claim 14, wherein the second extractant is N,N,N',N'-tetraoctyldiglycolamide.

* * * * *